I. Codd,
Corn Sheller.
No. 83,832. Patented Nov 10, 1868.
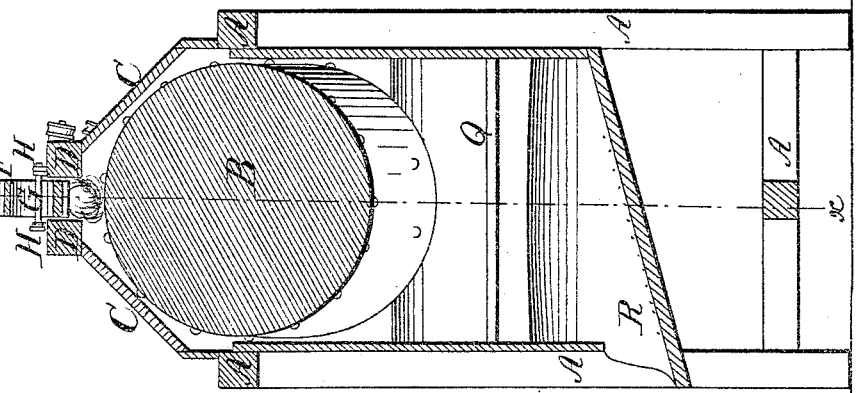
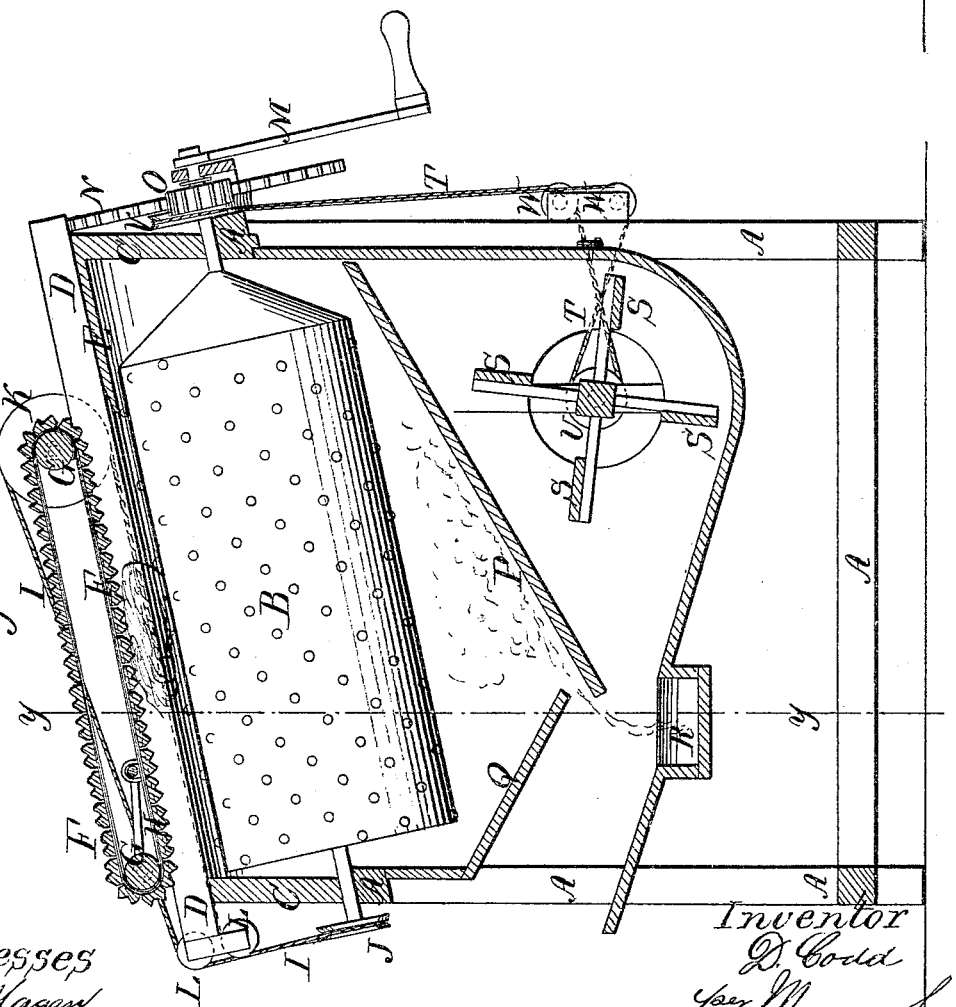
Witnesses
Wm A. Hagan
G. C. Cotton
Inventor
D. Codd
per Munn & Co
Attorneys

D. CODD, OF OTTAWA, CANADA.

Letters Patent No. 83,832, dated November 10, 1868.

IMPROVEMENT IN CORN-SHELLER.

The Schedule referred to in these Letters Patent and making part of the same.

*To all whom it may concern:*

Be it known that I, D. CODD, of Ottawa, in the county of Carleton, Province of Ontario, and Dominion of Canada, have invented a new and useful Improvement in Corn-Shellers; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line x x, fig. 2.

Figure 2 is a vertical cross-section of the same, taken through the line z z, fig. 1.

Similar letters of reference indicate like parts.

My invention has for its object to furnish a simple, convenient, and effective machine for shelling corn, which shall be so constructed and arranged as to do its work quickly and well, removing all the kernels, whatever may be the size or shape of the ear; and it consists in the construction and combination of various parts of the machine, as hereinafter more fully described.

A is the frame of the machine, the forward end of which is made higher than the rear end, so that its upper part may be inclined, as shown in fig. 1.

B is a cylinder, the journals of which revolve in bearings in the upper or inclined part of the frame A, as shown in fig. 1.

The surface of the cylinder B is studded with teeth, as shown in fig. 1, to take hold of and remove the kernels from the cob, as the ears are passing through the machine.

The upper part of the cylinder B is enclosed with a casing, C, so as to leave a longitudinal opening or slot in the upper part of said casing, from one end of the machine to the other.

D are two bars, placed and secured in the opening in the casing C, parallel with each other, and at such a distance apart as will form a suitable channel or passage-way for the ears of corn.

E is a short apron, placed in the upper or forward part of the space between the bars D, for convenience in inserting the ears.

F is an endless belt passing around rollers G, in such a position, that the lower part of said belt may be between the bars D, so as to rest upon the ears as they are being acted upon by the toothed cylinder B, and compels them to pass longitudinally through the machine at the same time that they are revolved laterally by the action of said toothed cylinder, so as to present every part of their surface to the said teeth.

The endless belt F is formed, by attaching grooved wooden or metallic blocks to a flexible belt, or by hinging the edges of said blocks to each other.

The journals of the lower or rear roller are pivoted to the rear ends of the arms H, the forward ends of which are pivoted to the bars D, to allow the rear part of the endless belt F to rise and lower to adjust itself to the size of the ear passing through the machine, said belt being held down upon the ear by its own weight.

The forward or upper roller G is pivoted to stationary bearings attached to the bars D.

The endless belt F may be driven, from the toothed cylinder B, by the belt I, which passes around the pulley J, attached to the journal of the said cylinder B, around the pulley K, attached to the journal of the forward roller G, and around the guide-pulleys L, pivoted to the frame A.

Motion may be imparted to the cylinder B by the crank M, attached to the journal of the large gear-wheel N, the teeth of which mesh into the teeth of the small gear-wheel O, attached to the forward journal of the cylinder B, so that the machine may be operated and fed conveniently by one and the same man, if desired.

The parts of the frame A, beneath the cylinder B, are also encased, and within the said casing are placed inclined aprons P and Q, upon which the kernels and chaff fall from the cylinder B, and from which they fall to the spout R, through which the kernels pass out at the side of the machine.

As the kernels of corn are falling from the aprons P and Q to the spout R, they fall through, and the chaff is driven off by the blast of the fans S, which are placed in the lower part of the machine, and which are driven by the belt T, which passes around the pulley U, attached to the end of the fan-shaft, around the pulley V, attached to or formed upon the side of the gear-wheel N, and around the guide-pulleys W, or by any other convenient means.

Having thus described my invention,

I claim as new, and desire to secure by Letters Patent—

1. The toothed cylinder B, and the corrugated or grooved endless belt F, in combination with each other, the toothed surface of said cylinder moving at right angles to the direction of said endless belt, substantially as herein shown and described, and for the purpose set forth.

2. The combination of the fan-blower S with the toothed cylinder B and endless belt F, substantially as herein shown and described, and for the purpose set forth.

3. Operating the endless belt F and fans S from the toothed cylinder B, substantially in the manner herein shown and described.

D. CODD.

Witnesses:
  NICHOLAS SPARKS,
  R. A. BRADLEY.